US 12,531,835 B2

(12) United States Patent
Barton et al.

(10) Patent No.: US 12,531,835 B2
(45) Date of Patent: Jan. 20, 2026

(54) MULTI-LAYERED SECURE EQUIPMENT ACCESS

(71) Applicant: Cisco Technology, Inc., San Jose, CA (US)

(72) Inventors: Robert E. Barton, Richmond (CA); Flemming Stig Andreasen, Marlboro, NJ (US); Jerome Henry, Pittsboro, NC (US); Elango Ganesan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 17/971,285

(22) Filed: Oct. 21, 2022

(65) Prior Publication Data

US 2024/0137344 A1 Apr. 25, 2024
US 2024/0236045 A9 Jul. 11, 2024

(51) Int. Cl.
*H04L 29/06* (2006.01)
*H04L 9/40* (2022.01)
*H04L 12/24* (2006.01)
*G06F 21/56* (2013.01)
(Continued)

(52) U.S. Cl.
CPC .............................. *H04L 63/0281* (2013.01)

(58) Field of Classification Search
CPC . H04L 63/0281; H04L 67/51; H04L 41/0894; H04L 41/12; H04L 63/105; H04L 63/20; H04L 67/56; H04L 67/63; H04L 41/046; Y02D 30/00

See application file for complete search history.

(56) References Cited

U.S. PATENT DOCUMENTS

| 8,413,227 B2 | 4/2013 | Chen |
| 10,999,289 B2 | 5/2021 | Shah et al. |
| 2018/0234260 A1 | 8/2018 | Mclaughlin et al. |

(Continued)

FOREIGN PATENT DOCUMENTS

| EP | 3644579 A1 * | 4/2020 | ............. G06F 21/56 |
| WO | WO-2016093722 A1 * | 6/2016 | ......... H04L 12/4633 |

OTHER PUBLICATIONS

Ayyoob Hamza, Dinesha Ranathunga, Hassan Habibi Gharakheili, Theophilus A. Benson, Matthew Roughan, Vijay Sivaraman; "Verifying and Monitoring IoTs Network Behavior Using MUD Profiles"; IEEE Transactions on Dependable and Secure Computing; vol. 19, No. 1; Jan./Feb. 2022; pp. 1-18 (Year: 2022).*

(Continued)

*Primary Examiner* — Fatoumata Traore
*Assistant Examiner* — Courtney D Fields
(74) *Attorney, Agent, or Firm* — Lee & Hayes, P.C.

(57) ABSTRACT

In one embodiment, a device receives discovery data generated by a plurality of networking devices in a network. The device determines, based on the discovery data, a hierarchy of layers of the network. The device receives a request by a client that is external to the network to access remotely a particular endpoint in the network. The device configures, and in response to the request, a proxy chain of remote access agents executed by a subset of networking devices from the plurality of networking devices to allow the client to access remotely the particular endpoint, each of those networking devices proxying traffic between different layers of the network.

20 Claims, 7 Drawing Sheets

(51) Int. Cl.
*H04L 12/28* (2006.01)
*H04L 29/08* (2006.01)

(56) References Cited

U.S. PATENT DOCUMENTS

| | | | |
|---|---|---|---|
| 2019/0356696 A1 | 11/2019 | Rojas et al. | |
| 2020/0137021 A1* | 4/2020 | Janakiraman | H04L 63/10 |
| 2021/0194932 A1* | 6/2021 | Hill | H04L 63/0876 |
| 2022/0232066 A1* | 7/2022 | Subramaniam | H04L 41/046 |

OTHER PUBLICATIONS

Mathezer, Stephen, "The Purdue Model and Best Practices for Secure ICS Architectures", Introduction to ICS Security Part 2, online: https://www.sans.org/blog/introduction-to-ics-security-part-2/, Jul. 16, 2021, accessed Sep. 16, 2022, 13 pages, SANS Institute.

"IEC 62443", online: https://en.wikipedia.org/wiki/IEC_62443, Sep. 2, 2022, accessed Sep. 16, 2022, 5 pages, Wikimedia Foundation, Inc.

Schick, Charlie, "How IIoT and the Cloud are Upending the Purdue Model in Manufacturing", online: https://owlcyberdefense.com/blog/how-iiot-and-the-cloud-are-upending-the-purdue-model-in-manufacturing/, Sep. 11, 2019, accessed Sep. 19, 2022, 5 pages, Owl Cyber Defense.

"Industrial communication networks—Network and system security —Part 3-3: System security requirements and security levels", International Standard, IEC 62443-3-3, Edition 1.0, Aug. 2013, 14 pages, International Electrotechnical Commission.

"IEC 62443 and Isasecure Certification Applicability to Building Control Systems", Report from the Isasecure Building Control Systems Cyber Security Working Group Draft 0.8, Jan. 16, 2017, 48 pages, ISA Security Compliance Institute.

Byres, Eric, "Using ISA/IEC 62443 Standards to Improve Control System Security", White Paper, Version 1.2, May 2014, 12 pages, Tofino Security.

"Secure Substation Declaration of Security Conformance IEC 62443-3-3", IEC 62443-3-3 Security Requirements, v1.00 Manual, Feb. 2020, 31 pages, Siemens.

Day, et al., "Bounding the router table size in an ISP network using RINA", 2011 International Conference on the Network of the Future, Nov. 2011, 5 pages, IEEE.

* cited by examiner

MULTI-LAYERED SECURE EQUIPMENT ACCESS

TECHNICAL FIELD

The present disclosure relates generally to computer networks, and, more particularly, to multi-layered, secure equipment access.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another, such as an IoT motion sensor communicating with a smart lightbulb, to turn the lights on when a person enters a room. The IoT has also expanded to industrial settings as part of the so-called "Industrial IoT" (IIoT) to control manufacturing processes and other operations in industrial settings (e.g., factories, mines, oil rigs, etc.).

As devices are increasingly added to the IoT and IIoT, the number of external users and services that require access to them has also increased. For instance, a remote technician may wish to connect to a particular IoT device so that they can perform maintenance on it (e.g., updating its firmware, running diagnostics, etc.). While this is a relatively straightforward task in simple network deployments, many IoT and IIoT deployments are multi-layered. Thus, configuring a secure connection between an external client and a particular device also requires configuring the connection to span multiple layers of a given network. For instance, in the context of a factory, the remote connection may need to span an enterprise zone, a demilitarized zone (DMZ), an industrial zone, or the like. Simply exposing the target device to the Internet would also present a significant security risk, potentially allowing malicious entities to take control over the device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
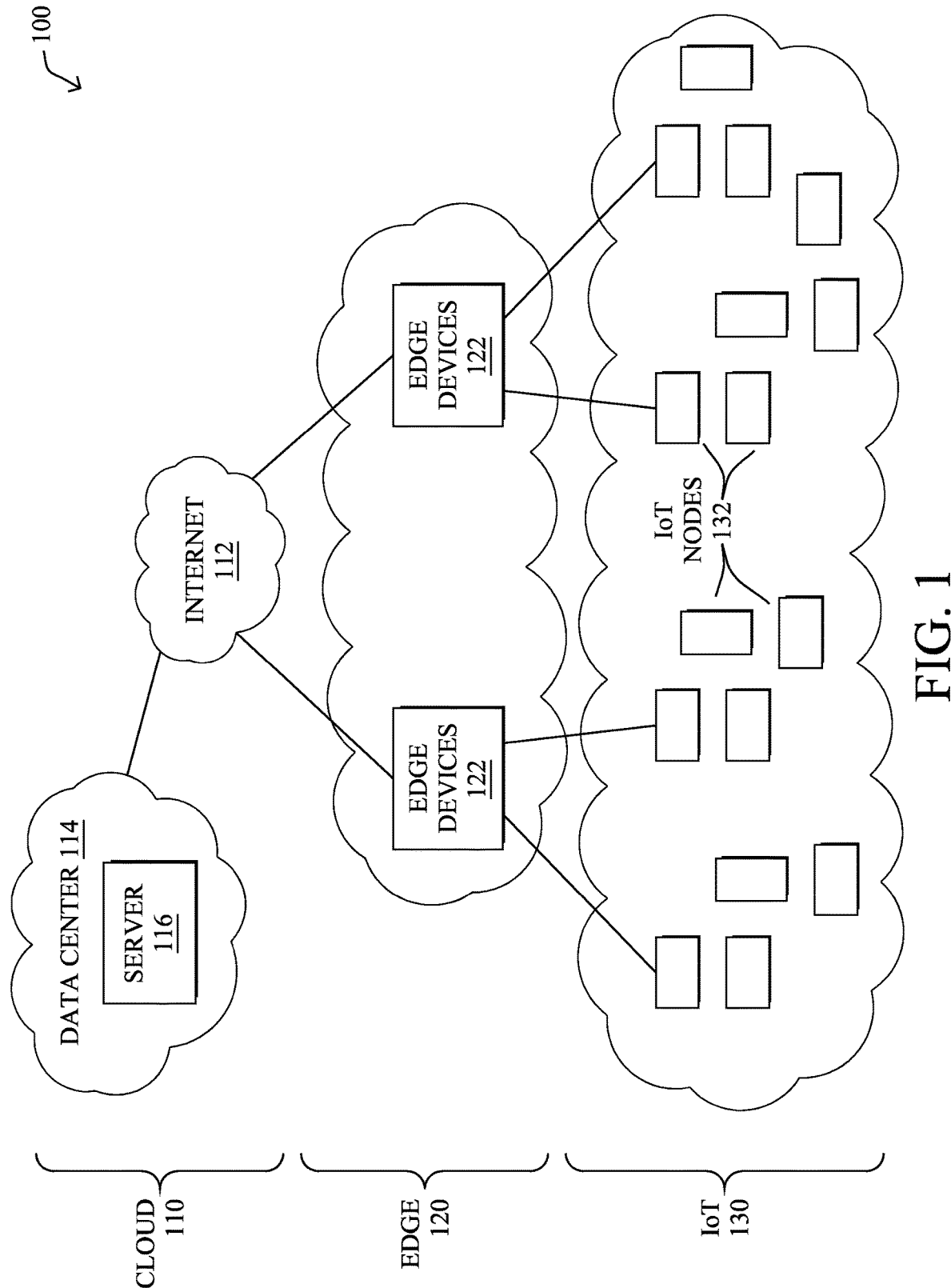
FIG. 1 illustrate an example network.

According to one or more embodiments of the disclosure, a device receives discovery data generated by a plurality of networking devices in a network. The device determines, based on the discovery data, a hierarchy of layers of the network. The device receives a request by a client that is external to the network to access remotely a particular endpoint in the network. The device configures, and in response to the request, a proxy chain of remote access agents executed by a subset of networking devices from the plurality of networking devices to allow the client to access remotely the particular endpoint, each of those networking devices proxying traffic between different layers of the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
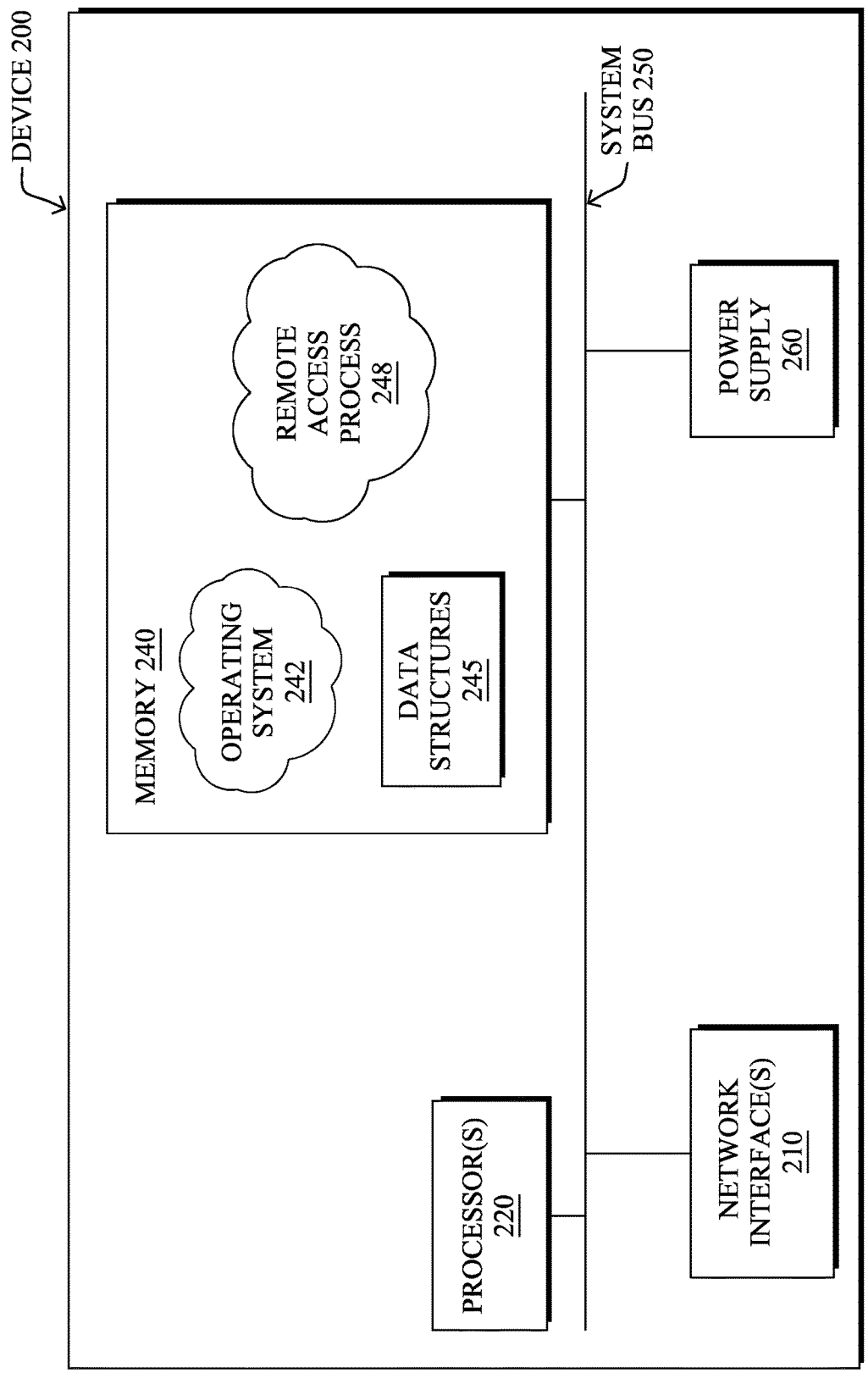
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative remote access process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many industrial IoT (IIoT)/operations technology (OT) networks are now deployed using a 'cookie-cutter' approach whereby discrete manufacturing or other control segments are deployed using duplicate IP addresses. In other words, the network may comprise a plurality of units, such as cells, zones, bays, etc., with addresses being repeated across units. As a result, different devices may belong to overlapping subnets. In addition, these devices may be located behind one or more firewalls and/or network address translation (NAT) devices.

Figure 3:
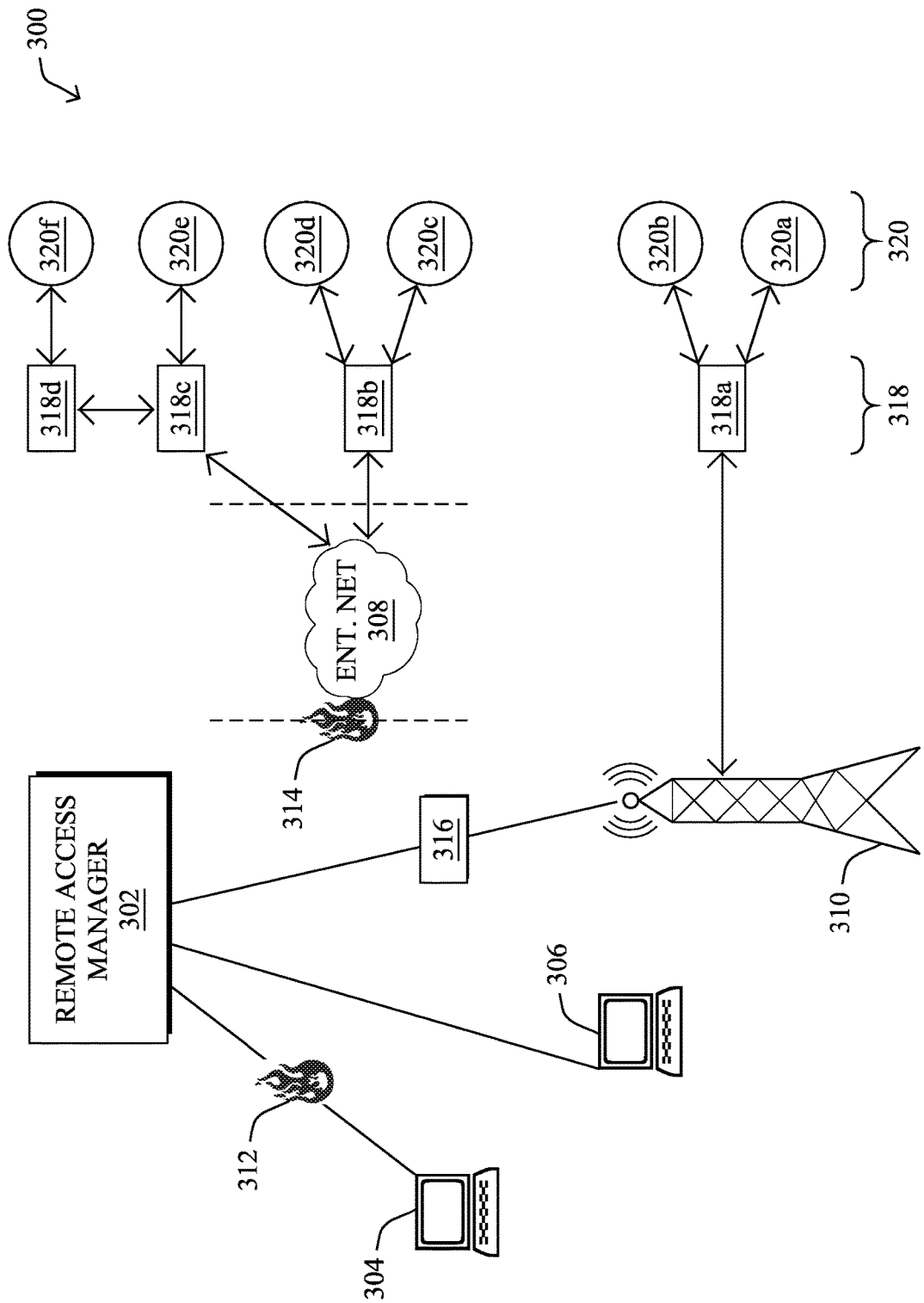
FIG. 3 illustrates an example of a remote access manager configuring remote access to an endpoint in a network.

By way of example, FIG. 3 illustrates an example 300 of a remote access manager 302 being used to configure remote access to an endpoint device in a network, according to various embodiments. As shown, assume that there are various endpoint IIoT devices 320 that are on a local network of a particular location, such as a factory, warehouse, or the like. In addition, assume that any or all of devices 320 each execute their own web application servers, allowing a technician to perform various functions such as reviewing diagnostic information, making configuration changes, and the like.

For instance, devices 320a-320b may be behind gateway 318a, which utilizes a cellular connection with a cell tower 310 and is behind NAT 316. Devices 320c-320d are behind gateway 318b, which is connected to an enterprise network 308 and behind a firewall 314. Likewise, device 320f is behind gateway 318d. Gateway 318d and device 320e are both behind gateway 318c, which is also connected to enterprise network 308 and behind firewall 314.

Remotely accessing the application web server of a particular device 320 is quite challenging under normal circumstances. For instance, assume that the user of client device 304 wishes to access the web server of device 320b. To enable such a connection, a remote access manager 302 may configure the various networking devices between client device 304 and device 320b, according to various embodiments.

While it is a relatively straightforward task for remote access manager 302 to configure a remote access connection in simple network deployments, many IoT and IIoT deployments are multi-layered. Thus, configuring a secure connection between an external client and a particular device also requires configuring the connection to span multiple layers of a given network. For instance, in the context of a factory, the remote connection may need to span an enterprise zone, a demilitarized zone (DMZ), an industrial zone, or the like. Simply exposing the target device to the Internet would also present a significant security risk, potentially allowing malicious entities to take control over the device.

Multi-Layered Secure Equipment Access

The techniques introduced herein allow for the secure remote access to endpoint devices located in multi-layered networks. In some aspects, a discovery mechanism is used herein to discover those networking devices in the multi-layered network that are capable of configuring an external connection to an endpoint in the network. By discovering the interrelations between such networking devices, the hierarchy of the network layers can be determined and used to configure a proxy chain between selected networking devices, to allow an external client access to a specific endpoint in the network.

Illustratively, the techniques described herein may be performed by hardware, software, and/or firmware, such as in accordance with remote access process 248, which may include computer executable instructions executed by the processor 220 (or independent processor of interfaces 210) to perform functions relating to the techniques described herein.

Specifically, in various embodiments, a device receives discovery data generated by a plurality of networking devices in a network. The device determines, based on the discovery data, a hierarchy of layers of the network. The device receives a request by a client that is external to the network to access remotely a particular endpoint in the network. The device configures, and in response to the request, a proxy chain of remote access agents executed by a subset of networking devices from the plurality of networking devices to allow the client to access remotely the particular endpoint, each of those networking devices proxying traffic between different layers of the network.

Figure 4A:
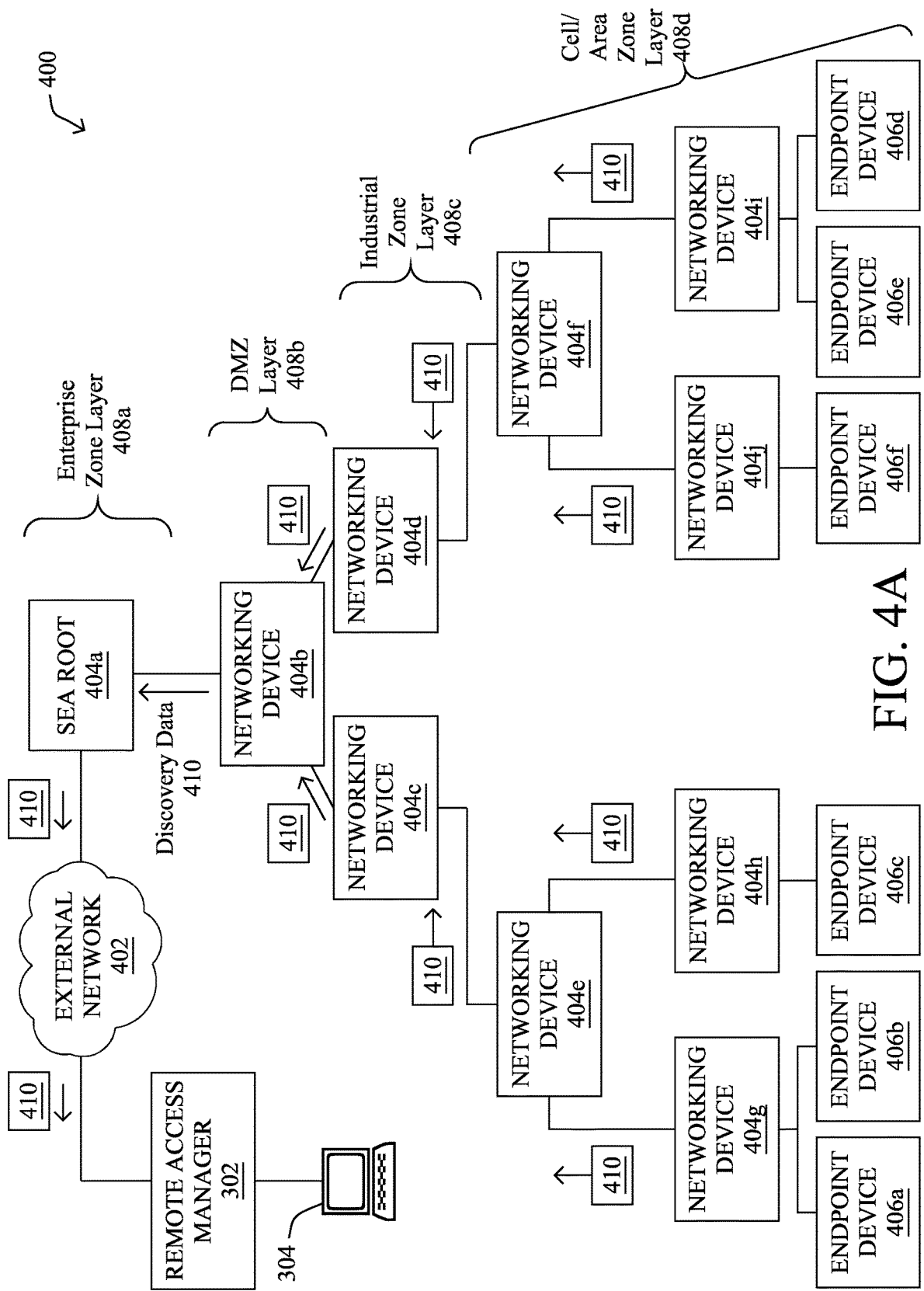
FIGS. 4A-4C illustrate an example of multi-layered secure equipment access.
Figure 4B:
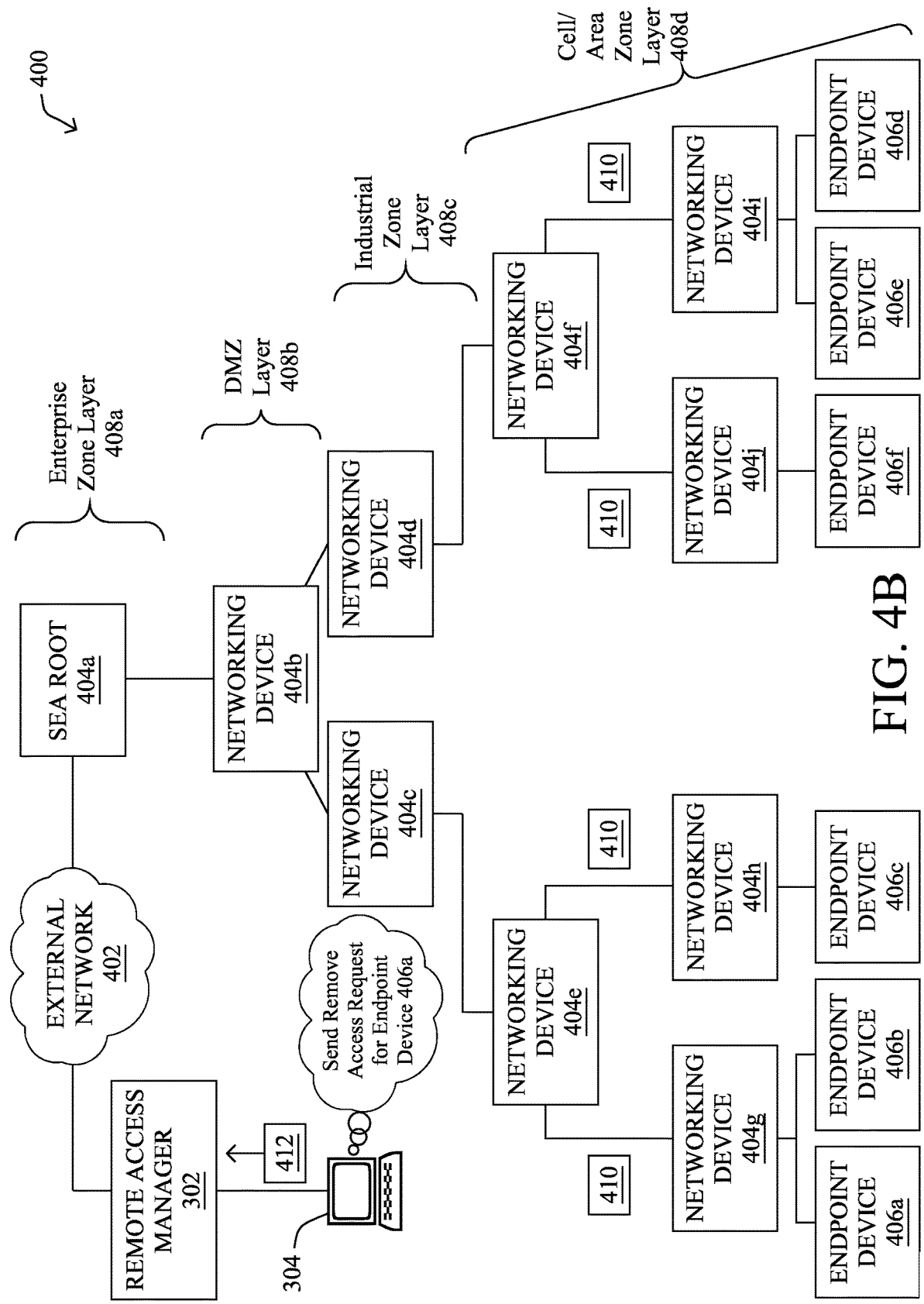
Figure 4C:
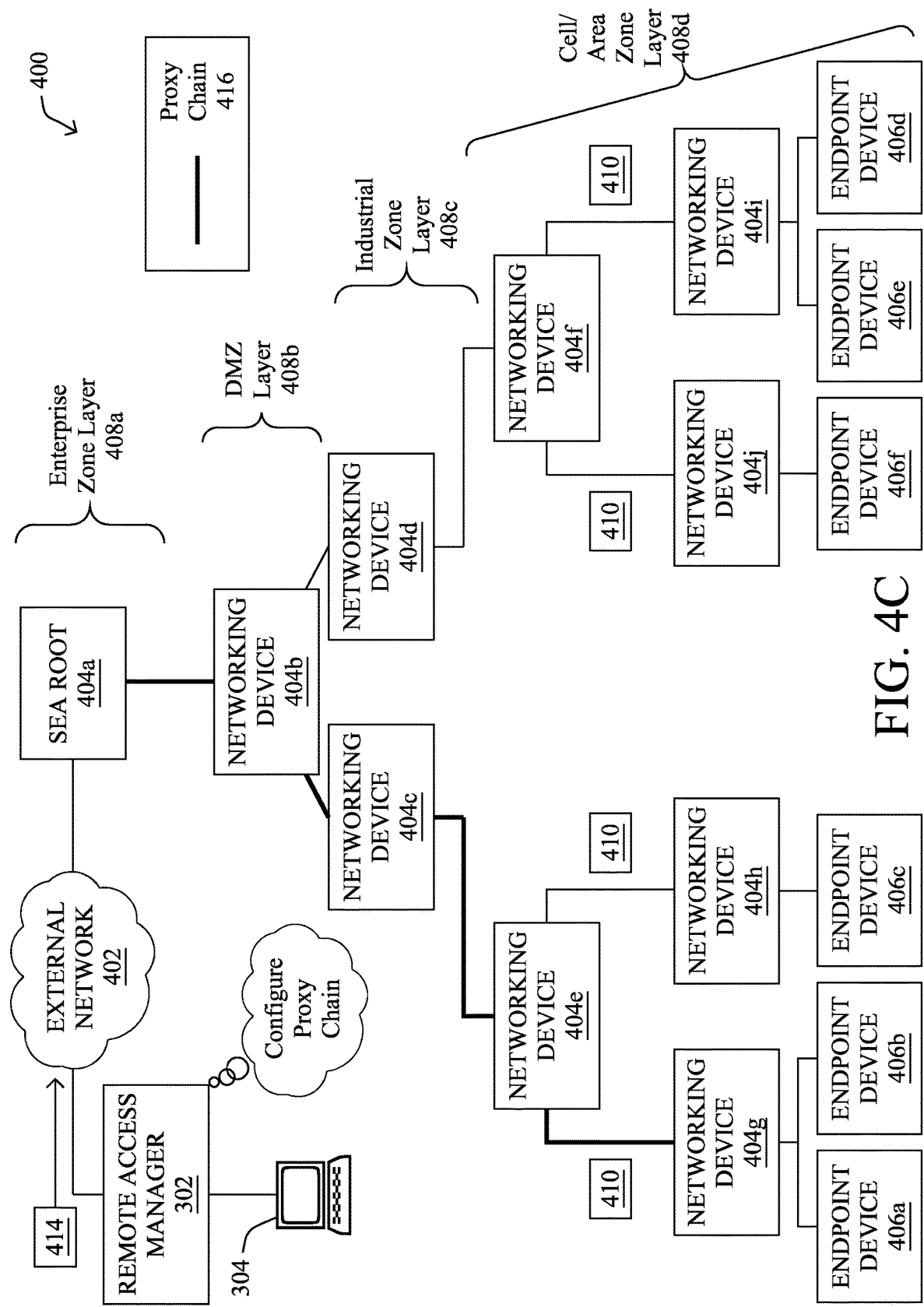

Operationally, FIGS. 4A-4C illustrate an example of multi-layered secure equipment access, according to various embodiments. As noted previously, many IoT and IIoT networks are multi-layered in nature. This is done primarily to create layers of security for different portions of a network. For instance, consider the case of a factory having industrial machinery that is controlled via programmable logic controllers (PLCs) that are on the local network. In addition, the factory may also include a number of offices in which users operate personal computers on the local network, to perform their daily tasks. As would be appreciated, these personal computers likely require access to the Internet, to allow their users to perform their daily tasks. However, exposing the PLCs in the same way to the Internet could very well lead to a malicious entity infiltrating them and causing physical damage to their associated machinery (e.g., by burning out a motor, etc.).

Many networks today are implemented in accordance with the International Electrotechnical Commission (IEC) 62443, which is a collection of cybersecurity standards to protect industrial networks. This collection of standards is closely related to the Purdue model, which originated in the early 1990s at Purdue University, with the goal of providing security to networks that include both operations technology (OT) and information technology (IT) networks, as in the above example of a factory. Under the Purdue model, the overall network is segmented into hierarchical layers, with enterprise and business layers existing at the top of the model. These layers primarily support the networking of servers, personal computers, and other IT-related devices. Below these layers is a demilitarized zone (DMZ) layer that exists as the boundary between the IT and OT portions of the network. Lower layers of the hierarchy of the DMZ layer thus include the OT devices of the network and the networking devices that support them. As would be appreciated, other standards or networking models may also be compatible with the techniques herein, so long as the network is organized into a multi-layered topology from a security perspective, in further embodiments.

By way of illustration, consider example 400 in FIG. 4A of a local network comprising any number of networking devices 404. These networking devices 404 (e.g., devices 404a-404j) may be deployed in accordance with IEC 62443 so as to define a plurality of layers 408, such as any or all or the following:

Enterprise Zone Layer 408a—this layer may support the various IT endpoints and IT functions for the network, as well as connect the local network to an external network 402, such as the Internet, or the like.

DMZ layer 408b—this layer primarily serves as a divider between the IT portions of the local network and its OT portions. For instance, in the case of a factory, DMZ layer 408b may exist between the personal computers in the offices of the factory and the OT components of the factory, such as its PLCs and networking devices that support the manufacturing equipment therein.

Industrial Zone Layer 408c—this layer may serve as the top layer for the OT portions of the network, thereby connecting any of the lower layer(s) of the OT portions of the network together (i.e., cell/area zones).

Cell/Area Zone Layer 408d—this layer may include different groups of OT devices that have been grouped together into cells/areas. For instance, consider the case in which a factory includes five bays, each of which houses the same type of manufacturing equipment. In such a case, each of these bays may be deployed as separate cells/areas from a networking perspective and implement their own networking policies. In many instances, such cells, bays, etc., may be deployed using a 'cookie-cutter' approach, often by using duplicate IP addresses and overlapping subnets, for easy of deployment.

A key aspect of implementing a multi-layered network is that a different networking policy may be implemented at each layer. For instance, assume that endpoint devices 406a-406f are arranged within different cells. In such a case, the network policies implemented within layer 408d may prevent one endpoint device 406 from communicating with another endpoint device 406 outside of its own cell. For instance, the networking policy may prevent endpoint device 406a from communicating with endpoint device 406f, as shown in FIG. 4A.

Typically, such networking policies associated with the different layers 408 of the network may restrict the set of devices with which a particular device may communicate, the type of traffic that it may send or receive, the protocols that it may use for its communications, the types of actions that may be performed, etc. These networking policies are typically most restrictive at the lowest layer of the network (e.g., layer 408d), with the highest layer having the least restrictive policy (e.g., layer 408a). For instance, while endpoint device 406a may be prevented from communicating with other endpoints within layer 408d, endpoint devices within layer 408a (e.g., personal computers, etc.) may not have the same restrictions and may even be able to communicate via external network 402.

According to various embodiments, any or all of the networking devices 404 within the network may be configured to support the establishment of a connection between an external client, such as client device 304, and an endpoint device in the network, such as endpoint device 406a. In general, these networking devices 404 may execute specialized software to discover one another and effect the formation of such a connection. For instance, such software (e.g., remote access process 248) may take the form of an agent executed by the networking device 404, functionality built into the operating system of the networking devices 404, or the like.

In addition to automatically discovering those networking devices 404 that can aid in configuring a remote connection between an endpoint device 406 and with an external client, another key functionality of these devices is the formation of a proxy chain across the different layers 408 of the network, in order to support the connection. More specifically, since the networking policies associated with the different layers 408 would normally prevent such a connection from being formed, certain ones of the networking devices 404 may act as proxies that convey the traffic between different layers 408 (e.g., through the formation of one or more tunnels along the proxy chain).

As an initial step, the networking devices 404 that are capable of assisting in the formation of an external/remote connection to an endpoint device in the network (e.g., any of endpoint devices 406) may utilize a discovery protocol to automatically discover other capable networking devices 404. Such networking devices 404 may also be configured with contextual details of their locations in the network (e.g., their specific layer 408, which cell/zone they are in, etc.), so that their generated discovery data 410 can be used to map the topology of these networking devices in the network across the different layers 408.

Thus, in some embodiments, networking devices 404 in the network that are capable of supporting an external connection via a proxy chain may generate and send discovery data 410 throughout the network, which may be collected by a designated 'root' networking device. For instance, as shown, the root networking device may be networking device 404a, as it is directly accessible from external network 402, such as the Internet. In one embodiment, the root networking device 404a may advertise itself as a root to other networking devices 404 in the network using a custom message that is understandable by any other networking device 404 also configured to support external/remote connections into the network. In turn, a receiving networking device 404 able to understand the discovery advertisement may return its discovery data 410 in response, as well as send the discovery advertisement onward to its children, which repeat the process, to promulgate their generated discovery data 410 back towards networking device 404a. Of course, the collection of discovery data 410 may be performed on a pull basis or push basis (e.g., sent periodically, etc.), in various embodiments.

For example, networking device 404a may advertise itself as a root via a custom message using a Layer 2 discovery protocol, such as the Cisco Discovery Protocol (CDP), Link Layer Discovery Protocol (LLDP), or other suitable protocol. Any receiving networking device 404 may then respond with its their generated discovery data 410, indicative of its location in the network or other context information.

In various embodiments, the discovery data 410 may then be sent to remote access manager 302 and used to compute a topology graph of those responding networking devices 404, thereby learning the hierarchy of layers 408 of the network and the networking devices 404 that can support a proxy chain for an external connection. It should be noted that while remote access manager 302 is shown located externally to that of the local network in which networking devices 404 reside, further embodiments provide for some or all of its functionality described herein to be integrated with one or more devices in the network (e.g., networking device 404a, etc.). In addition, as would be appreciated, remote access manager 302 may be implemented using one or more specifically configured devices (e.g., device 200), the collection of which may be viewed as a singular executing device for purposes of the teachings herein.

Through this discovery mechanism, remote access manager 302 will now have information regarding the different layers 408 of the network, their constituent networking devices 404 that are capable of supporting an external connection via a proxy chain, their attached endpoints or other devices, their corresponding security policies, other contextual information, or the like. Note also that such information may be formatted in various ways, without deviating from the teachings herein. For instance, each responding networking devices 404 may be identified using a naming mechanism that also identifies its location in the network (e.g., "SAEGW-xyz@cell-3-zone2.acme.com").

Now, assume that client device 304 wishes to remotely access endpoint device 406a, deep within the network. In such a case, client device 304 may send a request 412 to remote access manager 302, thereby requesting that an external connection be formed. In other embodiments, a similar approach could also be used by an administrator to request that remote access manager 302 configure an external connection between endpoint device 406a and some other external entity.

Regardless of the origin of request 412, remote access manager 302 may use its knowledge of the network to select networking devices 404 from among those discovered, to form a proxy chain in the network. For instance, in the case of endpoint device 406a, remote access manager 302 may identify networking devices 404g, 404e, 404c, 404b, and 404a as those needed to proxy the traffic throughout the network. Indeed, a key security aspect of many multi-leveled security models mandates that any given networking device can only communicate with one layer 408 below itself, not multiple levels. This means that a selected networking device 404 along the proxy chain may send traffic from one of its adjacent layers 408 to another adjacent layer 408, thereby getting around this restriction.

As shown in FIG. 4C, in response to request 412, remote access manager 302 may the send out instructions 414 that configure a specific proxy chain 416 within the network to support an external/remote connection between client device 304 and endpoint device 406a. In various embodiments, instructions 414 may instruct the networking devices 404 that are to make up proxy chain 416 regarding the specific hop-by-hop connections and security parameters required. For instance, in some embodiments, only certain types of application protocols (e.g., HTTPS, gRPC, etc.) may be used by the traffic conveyed via proxy chain 416. In addition, configuration of proxy chain 416 may also entail configuring any firewalls, NATs, etc. along the path, to support the external connection.

The result of the above approach is that proxy chain 416 can now be used to convey traffic through the various layers 408 of the network as part of an external/remote connection between endpoint device 406a and client device 304, but in a manner that still conforms with the security requirements of IEC 62443 and other multi-layered network security models. Indeed, proxy chain 416 may still prevent any direct communication between industrial zone layer 408c and enterprise zone layer 408a, requiring all such communications to go through DMZ layer 408b.

Figure 5:
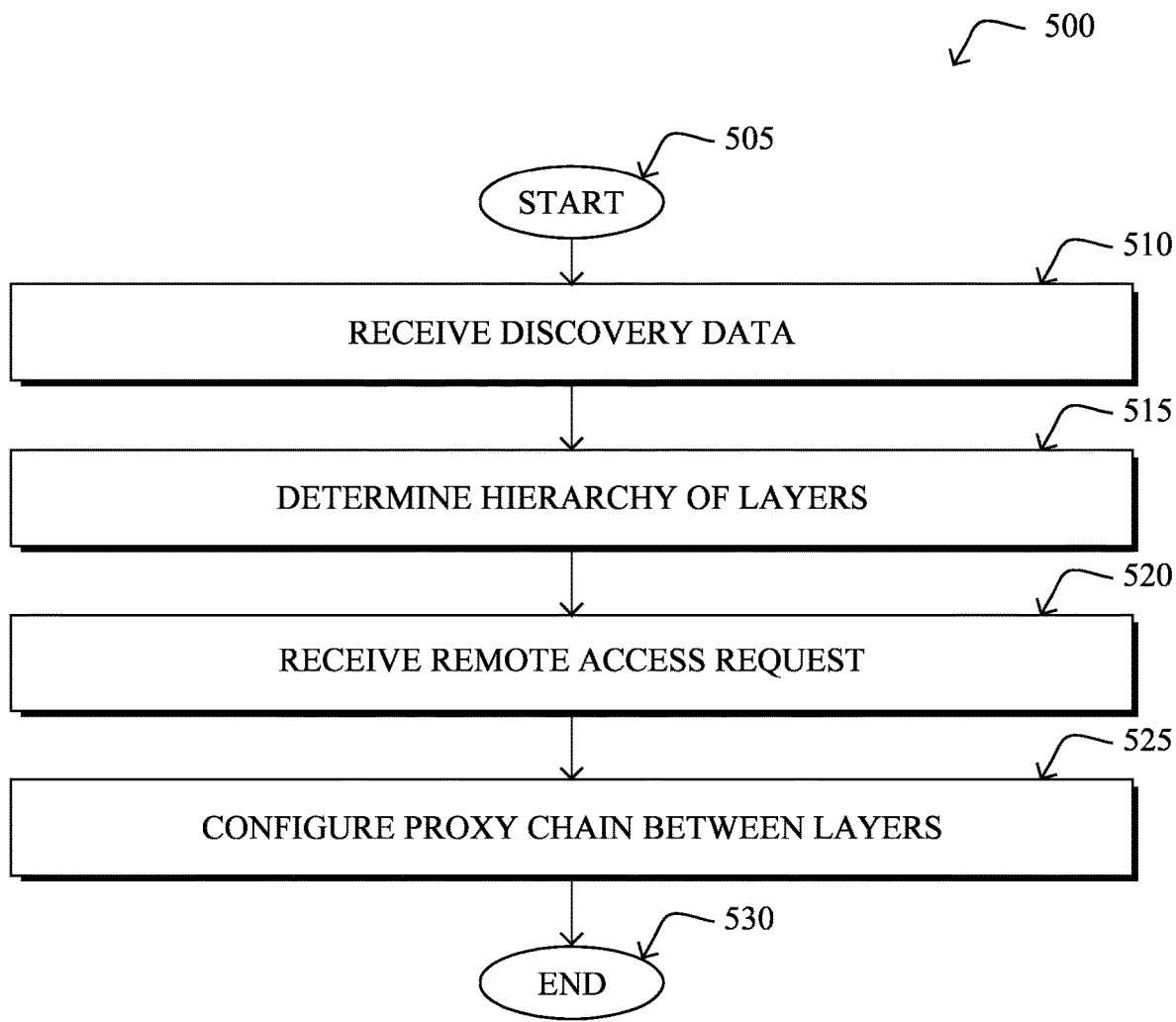
FIG. 5 illustrates an example simplified procedure for providing multi-layered secure equipment access.

FIG. 5 illustrates an example simplified procedure for providing multi-layered secure equipment access, in accordance with one or more embodiments described herein. For example, a remote access manager, which may take the form of a non-generic, specifically configured device (e.g., device 200), may perform procedure 500 by executing stored instructions (e.g., remote access process 248). The procedure 500 may start at step 505, and continues to step 510, where, as described in greater detail above, the device may receive discovery data generated by a plurality of networking devices in a network. In various embodiments, the plurality of networking devices generates the discovery data using a Layer-2 discovery protocol to discover networking devices that execute software configured to support remote connections into the network. In one embodiment, the software is a remote access agent. In some embodiments, the plurality of networking devices comprises one or more routers or switches.

At step 515, as detailed above, the device may determine, based on the discovery data, a hierarchy of layers of the network. In various embodiments, the layers of the network represent different IEC 62443 zones. In another embodiment, at least one of the layers of the network comprises a demilitarized zone (DMZ). In a further embodiment, each layer of the network has a different networking policy associated with it. In such a case, the discovery data may indicate which networking policies are associated with the plurality of networking devices.

At step 520, the device may receive a request by a client that is external to the network to access remotely a particular endpoint in the network, as described in greater detail above. In some embodiments, the device may also provide visual indicia of the plurality of networking devices and the hierarchy of layers of the network for display.

At step 525, as detailed above, the device may configure, in response to the request, a proxy chain of remote access agents executed by a subset of networking devices from the plurality of networking devices to allow the client to access remotely the particular endpoint, each of those networking devices proxying traffic between different layers of the network. In some embodiments, the proxy chain comprises at least one tunnel between the subset of networking devices. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the remote access of IoT devices in a secure manner, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   receiving, at a device, discovery data generated by a plurality of networking devices in a network, the discovery data identifying, for respective ones of the plurality of networking devices, a layer of a hierarchy of layers of the network and one or more networking policies associated with that respective layer;
   determining, by the device and based on the discovery data, the hierarchy of layers of the network that functionally organizes devices in the network by the one or more networking policies, the hierarchy comprising at least a first layer, a second layer, and an intermediate layer between the first layer and the second layer, wherein the one or more networking policies restrict communication among devices in different layers and require communication between the first layer and the second layer to traverse the intermediate layer;
   receiving, at the device, a request by a client that is external to the network to access remotely a particular endpoint in the network; and
   configuring, by the device and in response to the request, a proxy chain of remote access agents executed by a subset of networking devices to allow the client to access remotely the particular endpoint, wherein each of the subset of networking devices proxies traffic between adjacent layers of the hierarchy in accordance with the one or more networking policies so that the proxy chain spans a plurality of the layers and conveys traffic through the intermediate layer.

2. The method as in claim 1, wherein the layers of the network represent different IEC 62443 zones.

3. The method as in claim 1, wherein at least one of the layers of the network comprises a demilitarized zone (DMZ).

4. The method as in claim 1, wherein each layer of the network has a different networking policy associated with it.

5. The method as in claim 4, wherein the discovery data indicates which networking policies are associated with the plurality of networking devices.

6. The method as in claim 1, wherein the plurality of networking devices generates the discovery data using a Layer-2 discovery protocol to discover networking devices that execute software configured to support external connections into the network.

7. The method as in claim 6, wherein the software is a remote access agent.

8. The method as in claim 1, wherein the proxy chain comprises at least one tunnel between the subset of networking devices.

9. The method as in claim 1, further comprising:
   providing, by the device, visual indicia of the plurality of networking devices and the hierarchy of layers of the network for display.

10. The method as in claim 1, wherein the plurality of networking devices comprises one or more routers or switches.

11. An apparatus, comprising:
    one or more network interfaces;
    a processor coupled to the one or more network interfaces and configured to execute one or more processes; and
    a memory configured to store a process that is executable by the processor, the process when executed configured to:
      receiving, at a device, discovery data generated by a plurality of networking devices in a network, the discovery data identifying, for respective ones of the plurality of networking devices, a layer of a hierarchy of layers of the network and one or more networking policies associated with that respective layer;
      determine, based on the discovery data, the hierarchy of layers of the network that functionally organizes devices in the network by the one or more networking policies, the hierarchy comprising at least a first layer, a second layer, and an intermediate layer between the first layer and the second layer, wherein the one or more networking policies restrict communication among devices in different layers and require communication between the first layer and the second layer to traverse the intermediate layer;
      receive a request by a client that is external to the network to access remotely a particular endpoint in the network; and
      configure, in response to the request, a proxy chain of remote access agents executed by a subset of networking devices to allow the client to access remotely the particular endpoint, wherein each of the subset of networking devices proxies traffic between adjacent layers of the hierarchy in accordance with the one or more networking policies so that the proxy chain spans a plurality of the layers and conveys traffic through the intermediate layer.

12. The apparatus as in claim 11, wherein the layers of the network represent different IEC 62443 zones.

13. The apparatus as in claim 11, wherein at least one of the layers of the network comprises a demilitarized zone (DMZ).

14. The apparatus as in claim 11, wherein each layer of the network has a different networking policy associated with it.

15. The apparatus as in claim 14, wherein the discovery data indicates which networking policies are associated with the plurality of networking devices.

16. The apparatus as in claim 11, wherein the plurality of networking devices generates the discovery data using a Layer-2 discovery protocol to discover networking devices that execute software configured to support external connections into the network.

17. The apparatus as in claim 16, wherein the software is a remote access agent.

18. The apparatus as in claim 11, wherein the proxy chain comprises at least one tunnel between the subset of networking devices.

19. The apparatus as in claim 11, wherein the process when executed is further configured to:
provide visual indicia of the plurality of networking devices and the hierarchy of layers of the network for display.

20. A tangible, non-transitory, computer-readable medium storing program instructions that cause a device to execute a process comprising:
receiving, at a device, discovery data generated by a plurality of networking devices in a network, the discovery data identifying, for respective ones of the plurality of networking devices, a layer of a hierarchy of layers of the network and one or more networking policies associated with that respective layer;
determining, by the device and based on the discovery data, the hierarchy of layers of the network that functionally organizes devices in the network by the one or more networking policies, the hierarchy comprising at least a first layer, a second layer, and an intermediate layer between the first layer and the second layer, wherein the one or more networking policies restrict communication among devices in different layers and require communication between the first layer and the second layer to traverse the intermediate layer;
receiving, at the device, a request by a client that is external to the network to access remotely a particular endpoint in the network; and
configuring, by the device and in response to the request, a proxy chain of remote access agents executed by a subset of networking devices to allow the client to access remotely the particular endpoint, wherein each of the subset of networking devices proxies traffic between adjacent layers of the hierarchy in accordance with the one or more networking policies so that the proxy chain spans a plurality of the layers and conveys traffic through the intermediate layer.

* * * * *